United States Patent Office
2,995,602
Patented Aug. 8, 1961

2,995,602
SYNTHESIS OF GLUTAMIC ACID FROM GAMMA-BUTYROLACTONE - CARBOXYLIC ACID OR ALPHA-HYDROXYGLUTARIC ACID
Yoshio Kawai, 99 3-chome Nakase-cho, Kawasaki City, Japan, and Kei Matsumi, 87 Honan-cho, Suginami-ku, and Mutsuo Fuse, 15 1-chome Shin-machi, Setagaya-ku, Tokyo, Japan
No Drawing. Filed Dec. 5, 1956, Ser. No. 626,280
Claims priority, application Japan Dec. 9, 1955
8 Claims. (Cl. 260—534)

The present invention relates to the preparation of glutamic acid from gamma-butyrolactonecarboxylic acid, or its hydrated product, alpha-hydroxyglutaric acids.

The previously proposed processes involve difficult problems. Our process, however, is suitable for practical use.

Treating gamma-butyrolactonecarboxylic acid or its esters and the other derivatives with the ammination reagent such as liquid or alcoholic ammonia, we cleave the lactone-linkage into alpha-hydroxyglutaric monoamide, which is dehydrated to gamma-pyrrolidonecarboxylic acid by heating, and obtain glutamic acid in good yield by hydrolysis of this substance with acid or alkali solution. The reaction is as follows:

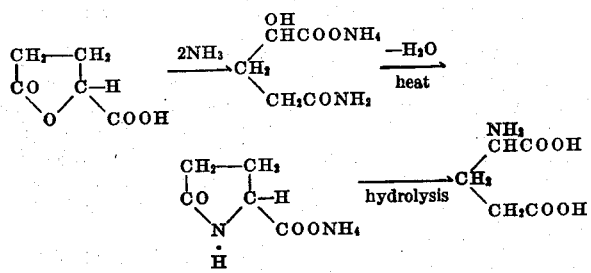

The above reaction is applicable to the metallic salts of gamma-butyrolactonecarboxylic acid, and in the case of alpha-hydroxyglutaric acid or its mono-metallic salts, in the ammination reagents, gamma-butyrolactonecarboxylic salts are formed by the inner-molecular dehydration sealing the lactone-linkage, so that the same results are obtained.

It has also been found that by using an acid catalyst gamma-butyrolactone-carboxylic acid can be esterified to yield diesters of alpha-hydroxyglutaric acid cleaving the lactone-linkage, and also its own ester. And each ester can be separated and purified from the mixture by fractional distillation. Both of these gamma-butyrolactonecarboxylic esters and alpha-hydroxyglutaric diesters are ammonolized to diamide of alpha-hydroxyglutaric acid (M.P. 162.5° C.), which forms gamma-pyrrolidonecarboxylic amide by heating with loss of water. And this compound is easily hydrated to glutamic acid. The equations are given as follows:

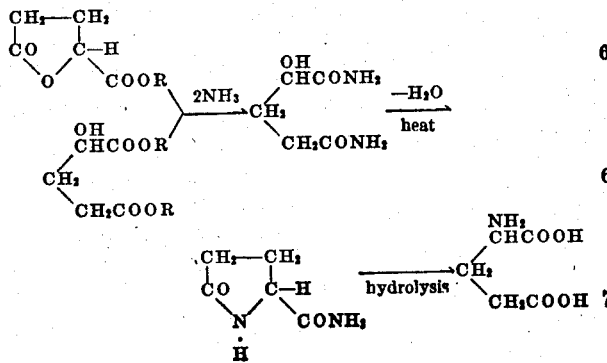

According to the present invention, the ammination of these starting substances is able to proceed advantageously, without the formation of secondary amine, such as in ordinary hydroxylic acids, without adding large excess of the ammination reagent.

And the intermediate products, gamma-pyrrolidonecarboxylic acid derivatives, are able to be obtained only by the temperature control of the reaction vessel, after the ammonolysis of the starting substances. The glutamic acid is synthesized easily and in good yield by our process.

In carrying out the reaction, the invention involves using, as the catalyst of ammonolysis NH₄Cl,

and so on (the ammono-acids); and as the catalysts of dehydration, ZnCl₂, NH₄Cl, active clay, silica-gel, active carbon, and toluene sulphonic acid, and which promote each reaction exceedingly.

The following examples will serve to illustrate the invention.

Example 1

10 g. of gamma-butyrolactonecarboxylic acid (M.P. 44–46° C.) was taken in a stainless steel autoclave and cooled with ice-salt or Dry Ice, and 6.8 g. of liquid ammonia (2.6 times of the theoretical amount) was then added. After sealing the autoclave, the mixture was heated in an oil-bath gradually, and kept 50–60° C. for 5 hours. Inner-molecular ester, the lactone linkage was cleaved into alpha-hydroxyglutaric monoamide in this process; thereafter, elevating the bath temperature to 150° C., and then gradually to 200° C. after 14 hours, the amide was dehydrated to pyrrolidone-linkage. From the cooled resulting solution, ammonia was eliminated, at first only by opening the autoclave, then under reduced pressure. The reaction mixture was washed out with water, and refluxed for 6 hours with 100 cc. of 6 N hydrochloric acid.

After this hydrolysis of gamma-pyrrolidonecarboxylic acid salt to glutamic acid hydrochloride, the water was removed in vacuo, then 17 g. of brownish crystal was obtained.

To this crude product the mixture of acetone (30 cc.) and ether (10 cc.) was added and refluxed for 30 minutes in a water bath in order to eliminate the unreacted gamma-butyrolactonecarboxylic acid and some other coloring impurities. After the extraction, 14 g. of residual yellowish crystal was washed out with 25 cc. of 95% alcohol twice and filtered.

The yellowish crude glutamic acid hydrochloride, obtained by evaporating the filtrate, was dissolved with 50 cc. of water and treated with active carbon after adding a drop of concentrated hydrochloric acid.

The solution was then concentrated in vacuo to the volume of 30 cc. and adjusted its pH to 3.2 with solid sodium carbonate, so that colorless glutamic acid was crystallized. The product after filtering and drying was 8.2 g., and the theoretical yield was 72.6%.

This crystal had M.P. 178–182° C., was characterized with ninhydrin color reaction, and with delicious acidic taste. Recrystallizing the crystal with 50% alcohol its M.P. was elevated to 197–198° C. and identified by the fact that it had the constant M.P. after mixing with pure glutamic acid.

Example 2

6.8 g. of liquid ammonia (2 times of the theoretical amount) was added to the mixture of 20.5 g. of diethyl alpha-hydroxyglutarate (B.P. 140–141° C./10 mm. Hg) and 5 g. of zinc chloride, as the catalyst of dehydration for the resulting amide, in a cooled stainless steel autoclave.

After sealing the vessel, the mixture was maintained at room temperature for two days and heated to 140–150° C. for 7 hours in an oil bath, and then the temperature was elevated to 150–200° C. gradually for 5 hours completing the reaction, and cooled.

Eliminating excess of ammonia, the resulting alcohol was distilled off in vacuo. The residual viscous solid was washed out with water and refluxed for 3 hours with 150 cc. of 6 N hydrochloric acid. The solution was then evaporated to 27 g. of brownish crystal.

From the crystal zinc chloride, the catalyst, and unreacted gamma-butyrolactonecarboxylic acid, and the other impurities was extracted with 80 cc. of acetone. The residual yellowish crystal (18.5 g.), the mixture of crude glutamic acid hydrochloride and ammonium chloride, was treated just as in Example 1 (extraction with 95% alcohol, decoloration, and adjustment of its pH). 10.9 g. of colorless crystal of glutamic acid was obtained and the theoretical yield was 73.6%.

*Example 3*

200 cc. of methanol and 1 cc. of concentrated sulfuric acid was added to 30 g. of gamma-butyrolactonecarboxylic acid and the latter was esterified in ordinary method.

After evaporating the excess of methanol, the ester was distilled and collected over the range of B.P. 125–131° C./2.5 mm. Hg (28.7 g). Its M.P. was 42–53° C. and the theoretical yield was 85%.

This distillate was recognized as the mixture of 87 parts of methyl gamma-butyrolactoncarboxylate and 13 parts of dimethyl-alpha-hydroxyglutarate, by its ester value and elementary analysis.

5 g. of the mixed ester was heated to 120° C. with 3 g. of liquid ammonia and 1 g. of ammonium chloride for 3 hours.

The resulting crystal, after eliminating the excess of liquid ammonia and the catalyst, ammonium chloride, had its own M.P. 162.5° C. and nitrogen content 19.1%; and the latter ensured the product as alpha-hydroxyglutaric diamide. To this resultant, 2 g. of active clay was added as dehydrating catalyst and the mixture was heated to 210° C. for 2 hours. The reaction to close pyrrolidone-linkage was occured, and 3.8 g. of glutamic acid was obtained, after same treating as in Example 1. The theoretical yield was 76%.

We claim as our invention:

1. A process for producing glutamic acid, which comprises contacting a compound selected from the group consisting of gamma-butyrolactone-carboxylic acid, alpha-hydroxyglutaric acid, methyl gamma-butyrolactone-carboxylate, dimethyl alpha-hydroxyglutarate, and diethyl alpha-hydroxyglutarate, with ammonia under superatmospheric pressure at a temperature and for a time sufficient to form an alpha-hydroxyglutaric amide, heating the amide at a temperature of about 200° C. for a time sufficient to form the corresponding cyclic compound selected from the group consisting of the ammonium salt of gamma-pyrrolidonecarboxylic acid and gamma-pyrrolidone-carboxylic amide, and hydrolyzing the cyclic compound to glutamic acid.

2. A process according to claim 1, in which the ammonia is in the form of liquid ammonia.

3. A process according to claim 1, in which the ammonia is in the form of alcoholic ammonia.

4. A process according to claim 1, in which the contacting with ammonia is carried out in the presence of a catalyst selected from the group consisting of ammonium chloride, and ammonium carbonate.

5. A process for producing the ammonium salt of alpha-hydroxyglutaric half amide, by contacting a compound selected from the group consisting of gamma-butyrolactone-carboxylic acid, and alpha-hydroxyglutaric acid with ammonia under superatmospheric pressure at a temperature of from 50° to 150° C. for a time sufficient to form said salt.

6. A process for producing alpha-hydroxyglutaric diamide, by contacting a compound selected from the group consisting of a methyl ester of gamma-butyrolactonecarboxylic acid, dimethyl ester of alpha-hydroxyglutaric acid, and diethyl ester of alpha-hydroxyglutaric acid with ammonia under superatmospheric pressure at a temperature of from 50° to 150° C. for a time sufficient to form said diamide.

7. A process for producing glutamic acid, which comprises heating gamma-butyrolactone-carboxylic acid with methanol and a small amount of sulfuric acid, contacting the resulting mixture of the methyl ester of gamma-butyrolactone-carboxylic acid and dimethyl ester of alpha-hydroxyglutaric acid with ammonia under superatmospheric pressure at a temperature and for a time sufficient to form alpha-hydroxy-glutaric diamide, heating the diamide at a temperature of about 200° C. and hydrolyzing the reaction product to glutamic acid.

8. A process according to claim 1, the temperature for said contacting being below about 150° C.

References Cited in the file of this patent

UNITED STATES PATENTS

| | | |
|---|---|---|
| 2,112,329 | Braun | Mar. 29, 1938 |
| 2,790,000 | Norman et al. | Apr. 23, 1956 |
| 2,791,606 | Novak et al. | May 7, 1957 |
| 2,837,532 | Purvis | June 3, 1958 |

OTHER REFERENCES

Beilstein Handbuch der Organischen Chemie, vol. 22, p. 284 (1935).

Karrer: Org. Chemistry (1938), p. 238, Nordeman Pub. Co. Inc., N.Y.